(12) United States Patent
Nakanishi

(10) Patent No.: US 10,497,319 B2
(45) Date of Patent: Dec. 3, 2019

(54) DISPLAY DEVICE AND METHOD FOR CONTROLLING BACKLIGHT

(71) Applicant: Panasonic Intellectual Property Management Co., Ltd., Osaka (JP)

(72) Inventor: Hirokazu Nakanishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/767,732

(22) PCT Filed: Sep. 14, 2016

(86) PCT No.: PCT/JP2016/004184
§ 371 (c)(1),
(2) Date: Apr. 12, 2018

(87) PCT Pub. No.: WO2017/098676
PCT Pub. Date: Jun. 15, 2017

(65) Prior Publication Data
US 2018/0308434 A1  Oct. 25, 2018

(30) Foreign Application Priority Data

Dec. 10, 2015 (JP) .................. 2015-241625
Mar. 30, 2016 (JP) .................. 2016-069475

(51) Int. Cl.
*G09G 3/34* (2006.01)
*G09G 3/36* (2006.01)

(52) U.S. Cl.
CPC .......... *G09G 3/3406* (2013.01); *G09G 3/36* (2013.01); *G09G 2320/066* (2013.01);
(Continued)

(58) Field of Classification Search
None
See application file for complete search history.

(56) References Cited

U.S. PATENT DOCUMENTS

2009/0002402 A1   1/2009  Barnhoefer et al.
2009/0040171 A1*  2/2009  Ishizumi .......... G02F 1/133602
                                           345/102
(Continued)

FOREIGN PATENT DOCUMENTS

JP    2014-041830    3/2014

OTHER PUBLICATIONS

International Search Report of PCT application No. PCT/JP2016/004184 dated Dec. 13, 2016.
(Continued)

*Primary Examiner* — Parul H Gupta
(74) *Attorney, Agent, or Firm* — McDermott Will & Emery LLP

(57) ABSTRACT

A display device includes a display panel that displays an image, a backlight that includes a light emitting surface that emits light toward a rear surface of the display panel, the light emitting surface being divided into a plurality of light emitting regions, and a controller that independently determines luminance of the backlight for each of the plurality of light emitting regions according to each luminance of a plurality of image regions in the image respectively corresponding to the plurality of light emitting regions. When the backlight satisfies a predetermined condition, while comparing each determined luminance of the plurality of light emitting regions with a threshold, the controller decreases luminance of a light emitting region having luminance greater than the threshold, and maintains luminance of a light emitting region having luminance not greater than the threshold.

5 Claims, 15 Drawing Sheets

(52) U.S. Cl.
CPC ............... *G09G 2320/0626* (2013.01); *G09G 2330/021* (2013.01); *G09G 2360/145* (2013.01)

(56) References Cited

U.S. PATENT DOCUMENTS

| | | | |
|---|---|---|---|
| 2009/0115720 A1* | 5/2009 | Inada | G09G 3/3426 |
| | | | 345/102 |
| 2010/0156955 A1 | 6/2010 | Kimura | |
| 2011/0025728 A1 | 2/2011 | Baba et al. | |
| 2012/0139885 A1* | 6/2012 | Iwasa | G09G 3/3426 |
| | | | 345/207 |
| 2015/0213586 A1 | 7/2015 | Koike et al. | |
| 2016/0189409 A1* | 6/2016 | Aiba | G09G 5/14 |
| | | | 345/629 |

OTHER PUBLICATIONS

The Extended European Search Report dated Oct. 30, 2018 for the related European Patent Application No. 16872578.6.

\* cited by examiner

DISPLAY DEVICE AND METHOD FOR CONTROLLING BACKLIGHT

This application is a U.S. national stage application of the PCT International Application No. PCT/JP2016/004184 filed on Sep. 14, 2016, which claims the benefit of foreign priority of Japanese patent applications No. 2015-241625 filed on Dec. 10, 2015 and No. 2016-069475 filed on Mar. 30, 2016, the contents all of which are incorporated herein by reference.

TECHNICAL FIELD

The present disclosure relates to a display device and a method for controlling a backlight.

BACKGROUND ART

For example, a display device including a backlight, such as a liquid crystal television receiver, adopts a technique called local dimming.

PTL 1 discloses a technique related to the local dimming. The local dimming is a technique that divides a light emitting surface of a backlight into a plurality of light emitting regions, and independently determines luminance of the backlight for each light emitting region in accordance with luminance of an image displayed on a display panel. This configuration can improve contrast of an image in one frame.

In the above-described display device, power saving control that suppresses power consumption of the backlight may be performed by reducing the luminance of the backlight. More specifically, when an average value of luminance of the entire backlight is greater than a constant value, the power saving control simultaneously reduces luminance of all light emitting regions in the backlight.

CITATION LIST

Patent Literature

PTL 1: Unexamined Japanese Patent Publication No. 2014-41830

SUMMARY

The present disclosure provides a display device and a method for controlling a backlight that are able to improve gradation expression in a dark portion of an image when power saving control is performed.

The display device of the present disclosure includes a display panel that displays an image, a backlight that includes a light emitting surface that emits light toward a rear surface of the display panel, the light emitting surface being divided into a plurality of light emitting regions, and a controller that independently determines luminance of the backlight for each of the plurality of light emitting regions according to each luminance of a plurality of image regions in the image respectively corresponding to the plurality of light emitting regions. When the backlight satisfies a predetermined condition, while comparing each determined luminance of the plurality of light emitting regions with a threshold, the controller decreases luminance of a light emitting region having luminance greater than the threshold, and maintains luminance of a light emitting region having luminance not greater than the threshold.

The display device of the present disclosure can improve gradation expression in a dark portion of an image when power saving control is performed.

DESCRIPTION OF EMBODIMENTS

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding by those skilled in the art.

Note that the attached drawings and the following description are provided for those skilled in the art to fully understand the present disclosure, and are not intended to limit the subject matter as described in the appended claims.

Each of the drawings is also schematic view, and is not always exactly illustrated. In each of the drawings, substantially identical components are denoted by identical numerals, and their descriptions may be omitted or simplified as appropriate.

First Exemplary Embodiment

A first exemplary embodiment will be described herein with reference to FIGS. 1 to 8.

[1-1. Entire Configuration of Display Device]

First, an overall configuration of display device 2 according to the first exemplary embodiment will be described herein with reference to FIGS. 1 and 2.

Figure 1:
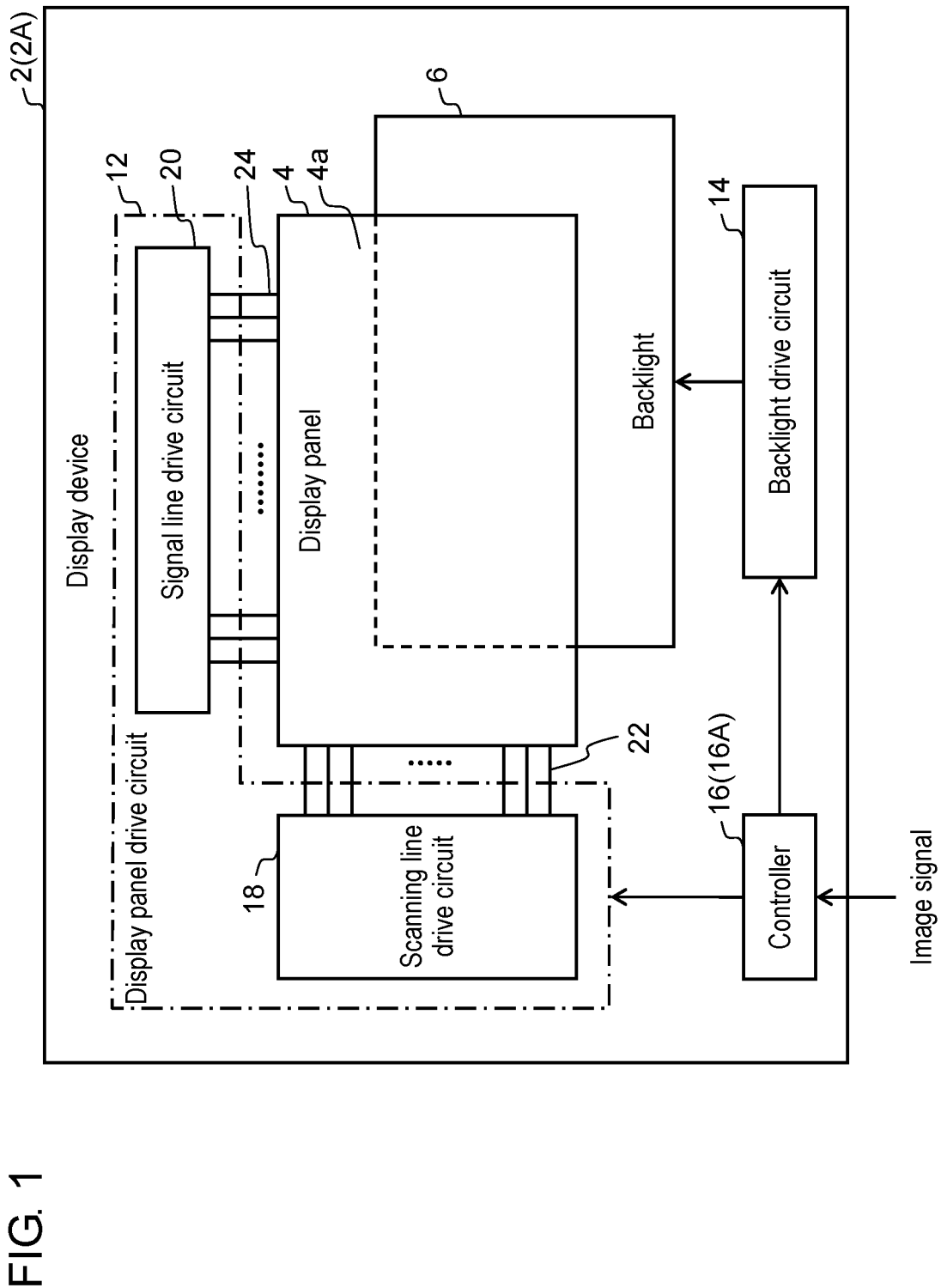
FIG. 1 is a block diagram schematically illustrating an example of a configuration of a display device according to a first exemplary embodiment.

FIG. 1 is a block diagram schematically illustrating an example of a configuration of display device 2 according to the first exemplary embodiment.

Figure 2:
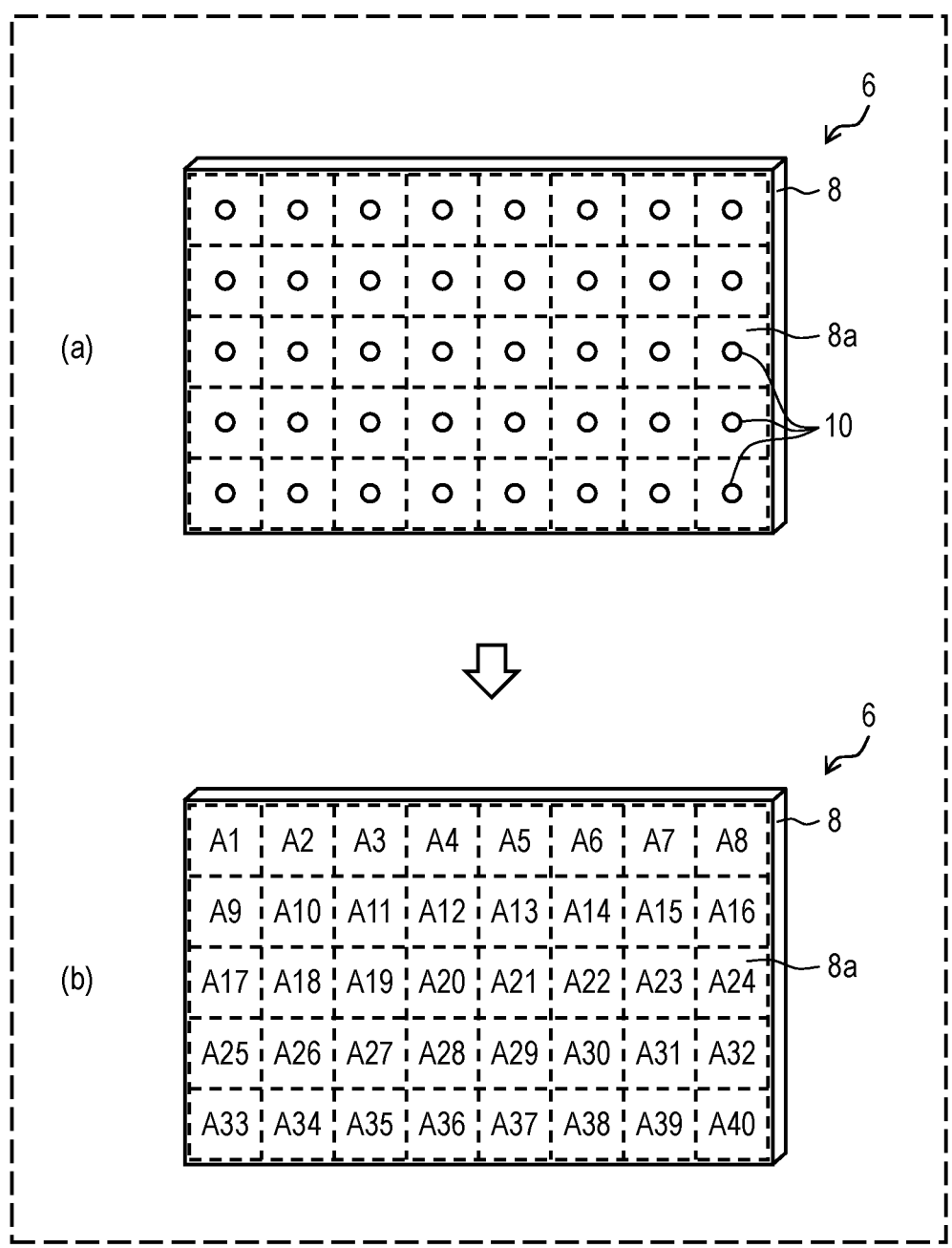
FIG. 2 is a view schematically illustrating an example of a configuration of a backlight of the display device according to the first exemplary embodiment.

FIG. 2 is a view schematically illustrating an example of a configuration of backlight 6 of display device 2 according to the first exemplary embodiment. Part (a) of FIG. 2 is a perspective view schematically illustrating an example of an appearance of backlight 6 according to the first exemplary embodiment, and part (b) of FIG. 2 is a perspective view schematically illustrating an example of light emitting regions A1 to A40 of backlight 6 according to the first exemplary embodiment. Note that, broken lines, signs A1 to A40, and the like illustrated in FIG. 2 are illustrated for convenience in order to allow the plurality of light emitting regions to be grasped visually.

As illustrated in FIG. 1, display device 2 is, for example, a liquid crystal television receiver of a flat panel display type. Display device 2 includes display panel 4 and backlight 6.

Display panel 4 is a liquid crystal panel for displaying image 26 (see FIG. 7 described later). On a front surface of display panel 4, display screen 4a on which image 26 is displayed is formed.

Backlight 6 is a direct-type backlight that emits light toward a rear surface of display panel 4 (that is, a surface opposite to the front surface on which display screen 4a is formed). As illustrated in part (a) of FIG. 2, backlight 6 includes substrate 8 including light emitting surface 8a and a plurality of light emitting diodes (LEDs) 10 mounted on light emitting surface 8a.

Substrate 8 is disposed such that light emitting surface 8a faces the rear surface of display panel 4. The plurality of LEDs 10 is arranged on light emitting surface 8a in a lattice shape. As illustrated by broken lines in part (b) of FIG. 2, light emitting surface 8a is virtually divided into light emitting regions A1 to A40 arranged in a lattice shape. One LED 10 is disposed in each of light emitting regions A1 to A40. In parts (a) and (b) of FIG. 2, a contour of each of light emitting regions A1 to A40 is illustrated by using the broken lines. Note that a number of light emitting regions formed on light emitting surface 8a is not limited to 40. The number of light emitting regions may be less than 40, or may be not less than 41. Further, a number of LEDs 10 disposed in each of the light emitting regions is not limited to one, and may be not less than two.

As illustrated in FIG. 1, display device 2 further includes display panel drive circuit 12, backlight drive circuit 14, and controller 16.

Display panel drive circuit 12 includes scanning line drive circuit 18 and signal line drive circuit 20. Scanning line drive circuit 18 supplies, through a plurality of control lines 22 disposed in each row (that is, extending in a direction parallel to a long side of display panel 4), a control signal for controlling a display operation to each of a plurality of pixel parts (not illustrated) disposed in the row in display panel 4. Signal line drive circuit 20 supplies, through a plurality of data lines 24 disposed in each column (that is, extending in a direction parallel to a short side of display panel 4), a data signal indicating light emitting luminance to each of the plurality of pixel parts disposed in the column in display panel 4.

Backlight drive circuit 14 drives backlight 6 by supplying a drive current to each of the plurality of LEDs 10 of backlight 6.

Controller 16 controls display panel drive circuit 12 and backlight drive circuit 14 based on an image signal obtained from the outside. Controller 16 is configured to include a storage (not illustrated) that stores a control program and an operation processor (not illustrated) that executes the control program, for example. Note that the image signal is a signal for forming image 26 on display panel 4. The image signal is output from, for example, a recording medium such as a digital versatile disc (a DVD) or a broadcast receiver for terrestrial digital broadcasting, satellite digital broadcasting, or the like.

Controller 16 controls backlight drive circuit 14 with the local dimming. More specifically, controller 16 independently determines luminance of backlight 6 for each of light emitting regions A1 to A40 according to each luminance of image regions B1 to B40 in image 26 (see FIG. 7 described later) respectively corresponding to light emitting regions A1 to A40. At this time, controller 16 determines each luminance of light emitting regions A1 to A40 between 0% (the lowest luminance) and 100% (the highest luminance).

For example, in a case where luminance of image region B1 in image 26 (see FIG. 7 described later) corresponding to light emitting region A1 is luminance of high gradation (relatively bright luminance), controller 16 determines luminance of light emitting region A1 (that is, luminance of LED 10 disposed in light emitting region A1) to be brightness according to the luminance of image region B1 (for example, 90%). Further, for example, in a case where luminance of image region B2 in image 26 (see FIG. 7 described later) corresponding to light emitting region A2 is luminance of low gradation (relatively dark luminance), controller 16 determines luminance of light emitting region A2 (that is, luminance of LED 10 disposed in light emitting region A2) to be brightness according to the luminance of image region B2 (for example, 30%). In display device 2, the local dimming described above is performed, thereby improving contrast of image 26 in one frame.

[1-2. Method for Controlling Backlight]

Subsequently, a method for controlling backlight 6 according to the first exemplary embodiment will be described with reference to FIGS. 3 to 7.

Figure 3:
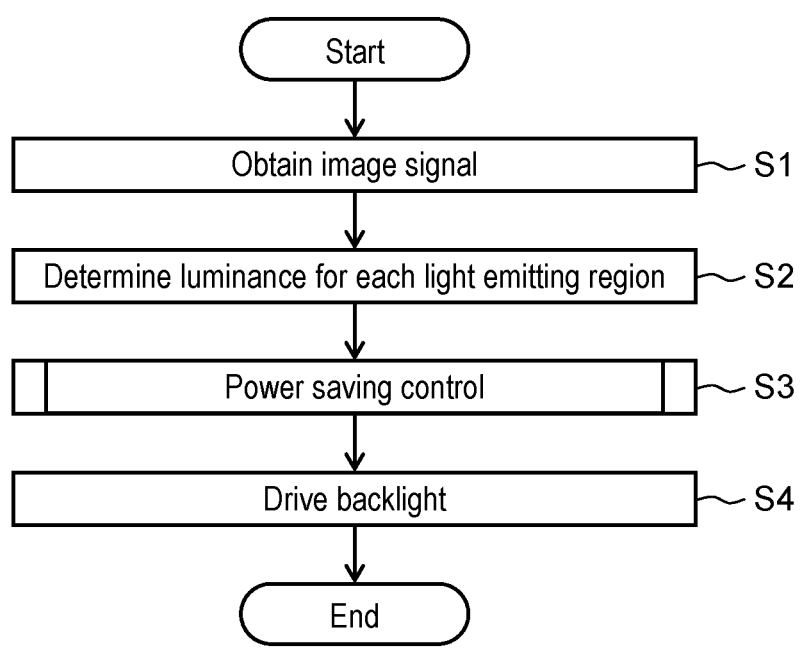
FIG. 3 is a flowchart illustrating an example of a method for controlling the backlight performed in the display device according to the first exemplary embodiment.

FIG. 3 is a flowchart illustrating an example of the method for controlling backlight 6 performed in display device 2 according to the first exemplary embodiment.

Figure 4:
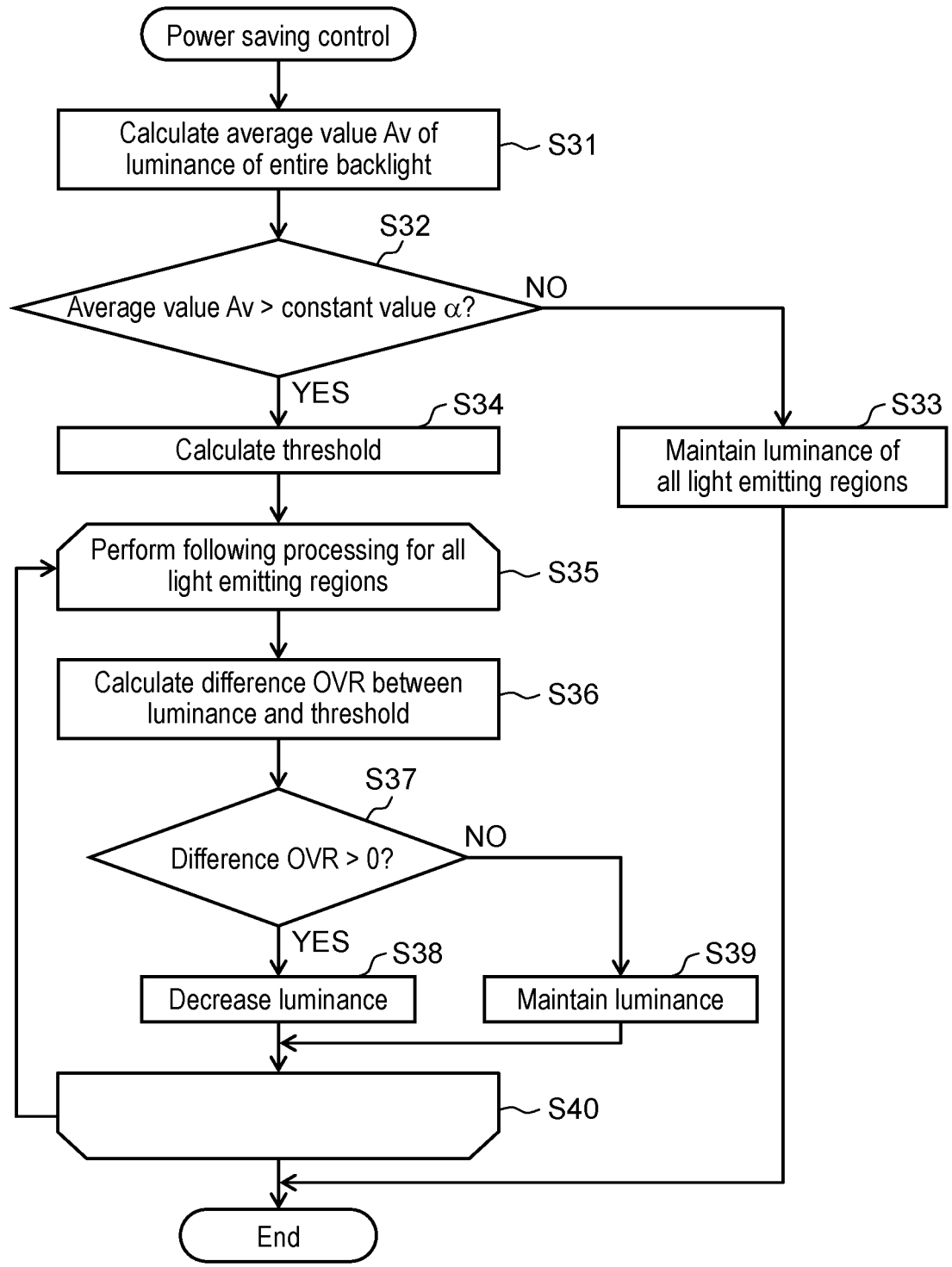
FIG. 4 is a flowchart illustrating an example of power saving control performed in the display device according to the first exemplary embodiment.

FIG. 4 is a flowchart illustrating an example of power saving control performed in display device 2 according to the first exemplary embodiment. The flowchart in FIG. 4 illustrates an example of a flow of power saving control (step S3) illustrated in FIG. 3.

Figure 5:
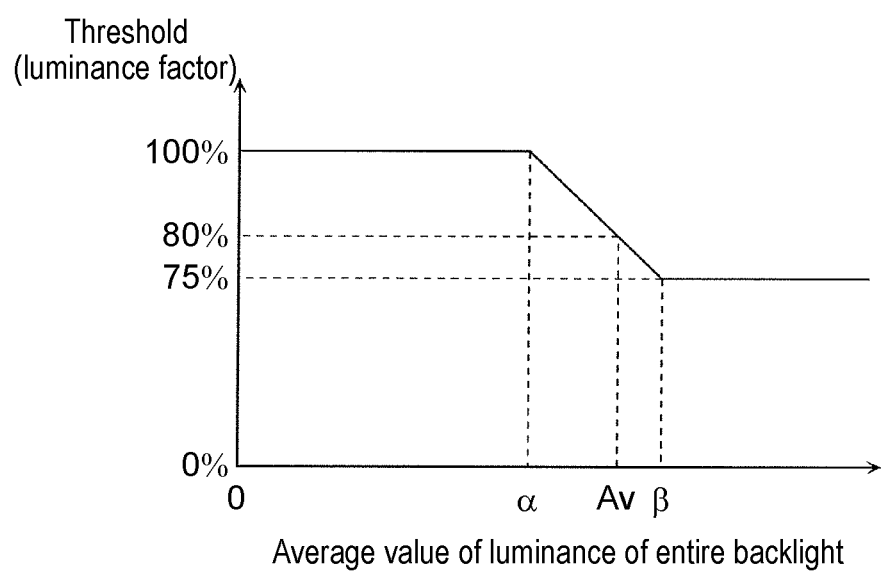
FIG. 5 is a graph illustrating an example of a relationship between an average value of luminance of the entire backlight and a threshold in the display device according to the first exemplary embodiment.

FIG. 5 is a graph illustrating an example of a relationship between an average value of luminance of entire backlight 6 and a threshold in display device 2 according to the first exemplary embodiment.

Figure 6:
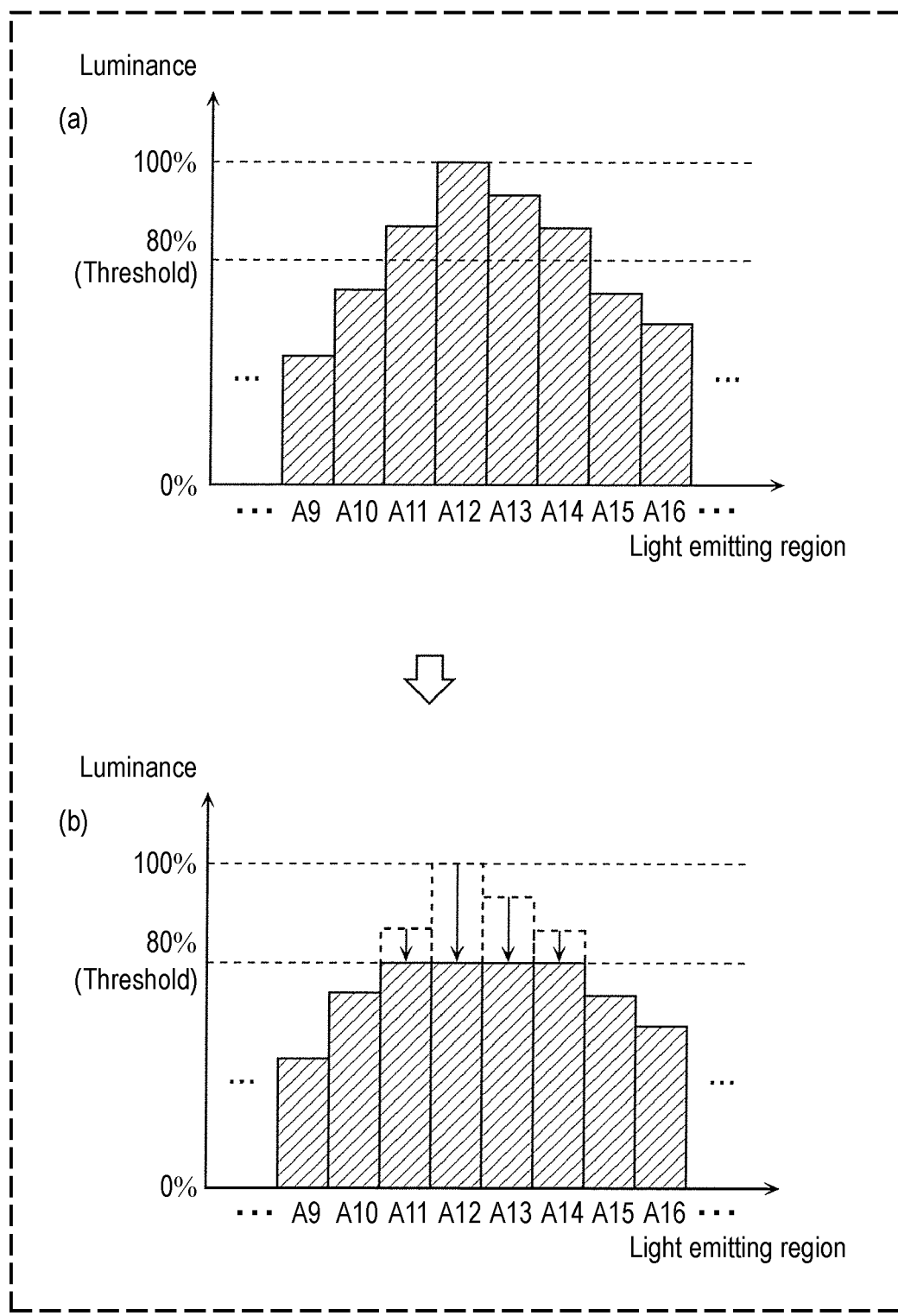
FIG. 6 is a graph illustrating an example of a change in luminance before and after the power saving control is performed in each of a plurality of light emitting regions set in the display device according to the first exemplary embodiment.

FIG. 6 is a graph illustrating an example of a change in luminance before and after the power saving control is performed in each of light emitting regions A1 to A40 set in display device 2 according to the first exemplary embodiment. Part (a) of FIG. 6 is a graph illustrating an example of luminance before the power saving control is performed in each of light emitting regions A1 to A40, and part (b) of FIG. 6 is a graph illustrating an example of luminance after the power saving control is performed in each of light emitting regions A1 to A40.

Figure 7:
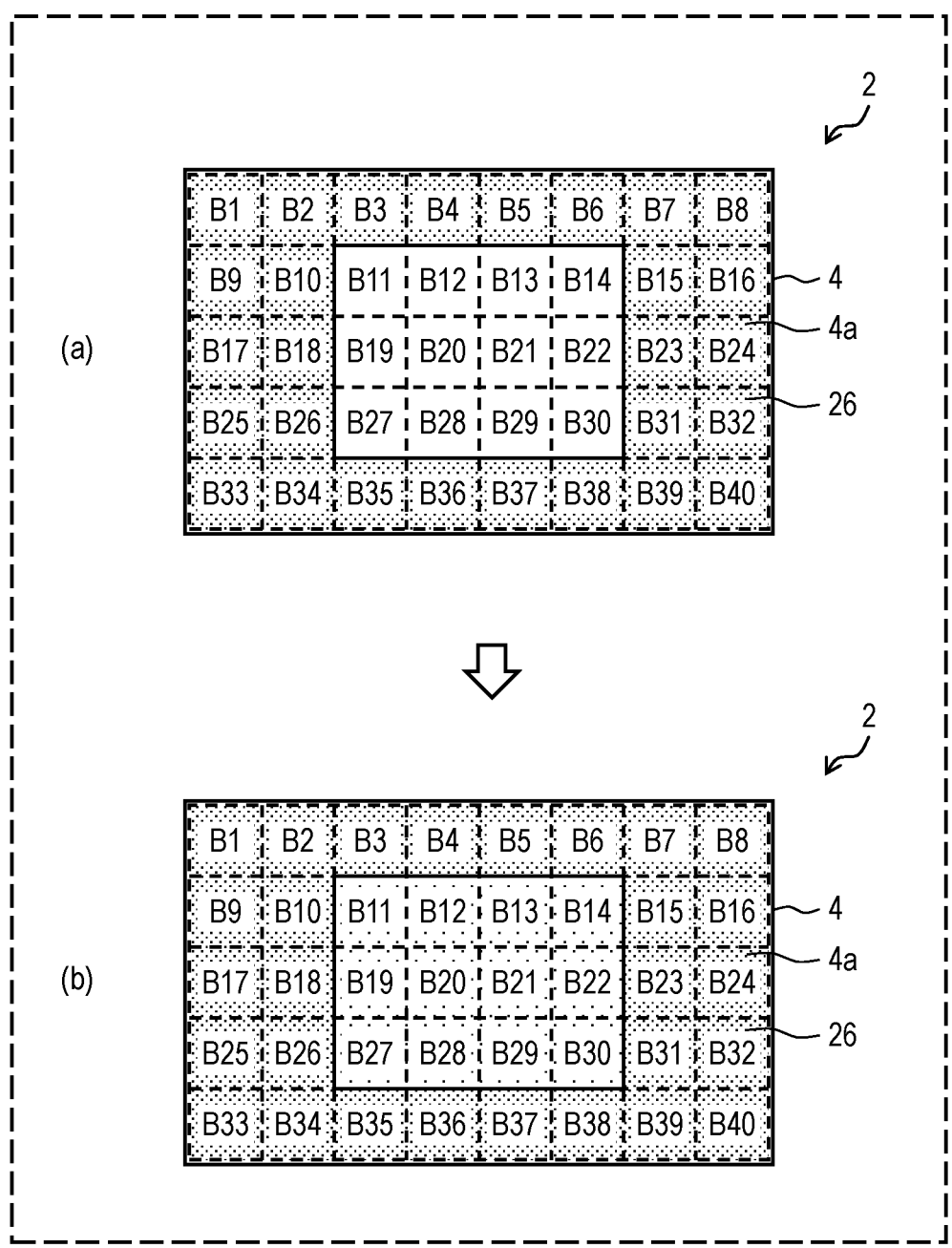
FIG. 7 is a view schematically illustrating an example of a change in luminance before and after the power saving control is performed in an image displayed on a display panel in the display device according to the first exemplary embodiment.

FIG. 7 is a view schematically illustrating an example of a change in luminance before and after the power saving control is performed in image 26 displayed on display panel 4 in display device 2 according to the first exemplary embodiment. Part (a) of FIG. 7 is a view schematically illustrating an example of luminance before the power saving control is performed in image 26 displayed on display panel 4 according to the first exemplary embodiment, and part (b) of FIG. 7 is a view schematically illustrating an example of luminance after the power saving control is performed in image 26 displayed on display panel 4 according to the first exemplary embodiment. Note that, broken lines, signs B1 to B40, and the like illustrated in FIG. 7 are illustrated for convenience in order to allow the plurality of light emitting regions to be grasped visually.

As illustrated in FIG. 3, controller 16 first obtains an image signal input from the outside (step S1).

Next, controller 16 determines each luminance Yn (n=1 to 40) of light emitting regions A1 to A40, based on the obtained image signal (that is, based on gradation of image 26 formed by the image signal) (step S2). Each luminance Yn (n=1 to 40) of light emitting regions A1 to A40 is, for example, based on the image signal, determined by using Equation 1 below, when Ymax denotes the maximum value of luminance in image region Bn (see FIG. 7 described later) corresponding to light emitting region An, and Yavr denotes an average value of the luminance. In Equation 1, k is a coefficient determined depending on average value Yavr.

$$Yn=(1-k)\times Ymax+k\times Yavr \quad \text{(Equation 1)}$$

Controller 16 then performs the power saving control based on luminance Yn (n=1 to 40) determined in step S2 (step S3), and drives backlight 6 by controlling backlight drive circuit 14 based on the power saving control (step S4).

Here, the power saving control (step S3) performed in the method for controlling backlight 6 according to the first exemplary embodiment will be described with reference to FIGS. 4 to 7.

As illustrated in FIG. 4, controller 16 first calculates average value Av of luminance of entire backlight 6 (that is, an average value of each luminance of all light emitting regions A1 to A40 determined in step S2 described above) (step S31).

Next, controller 16 compares average value Av calculated in step S31 with constant value α (step S32).

In step S32, in a case where average value Av is determined to be not greater than constant value α (NO in step S32), controller 16 does not perform the power saving control, and maintains each luminance of all light emitting regions A1 to A40 to be luminance determined in step S2 described above (step S33).

On the other hand, in step S32, in a case where average value Av is determined to be greater than constant value α (that is, when backlight 6 satisfies a predetermined condition) (YES in step S32), controller 16 performs the power saving control in the following manner.

Controller 16 first calculates a threshold of luminance (a so-called luminance factor) based on average value Av calculated in step S31 (step S34). At this time, controller 16 calculates the threshold by using graph data illustrated in FIG. 5, for example.

The graph data illustrated in FIG. 5 is data indicating an example of a relationship between average value Av of luminance of entire backlight 6 and the threshold. This graph data is stored in advance in a storage (not illustrated) included in controller 16, for example. In the example illustrated in FIG. 5, in a case where average value Av is not greater than constant value α, the threshold is 100% and is constant. In a case where average value Av is greater than constant value α and is not greater than constant value β, the threshold decreases as average value Av increases. In a case where average value Av is greater than constant value β (β>α), the threshold is, for example, 75% and is constant. Note that, the threshold when average value Av is greater than constant value β (in the example illustrated in FIG. 5, 75%) is determined in advance according to an amount of heat generated by backlight 6.

For example, in a case where average value Av calculated in step S31 described above is greater than constant value α and is not greater than constant value β, controller 16 calculates a threshold corresponding to average value Av (in the example of FIG. 5, "80%") based on the graph data illustrated in FIG. 5.

Controller 16 then calculates difference OVR by subtracting the threshold calculated in step S34 from each luminance of all light emitting regions A1 to A40, in order from light emitting region A1 to light emitting region A40 (step S36). Controller 16 first calculates difference OVR by subtracting the threshold calculated in step S34 from luminance of light emitting region A1.

Controller 16 determines whether difference OVR calculated in step S36 is greater than 0 (step S37).

In step S37, in a case where difference OVR is determined to be greater than 0, in other words, when luminance of light emitting region An that is a calculation target in step S36 (for example, light emitting region A1) is greater than the threshold calculated in in step S34 (YES in step S37), controller 16 reduces luminance of light emitting region An (for example, light emitting region A1) to the threshold calculated in step S34 (step S38).

For example, in a case where the luminance of light emitting region A1 is 90% and the threshold calculated in step S34 is 80%, controller 16 calculates difference OVR as 10% (=90%−80%) in step S36. Since difference OVR (10%) is greater than 0, controller 16 reduces the luminance of light emitting region A1 from 90% to 80% in step S38.

Note that, in a case where the luminance of light emitting region An that is a calculation target in step S36 (for example, light emitting region A1) is greater than the threshold calculated in step S34, luminance of image region Bn in image 26 (for example, image region B1 (see FIG. 7 described later)) corresponding to light emitting region An (for example, light emitting region A1) is luminance of high gradation.

On the other hand, in step S37, in a case where difference OVR is determined to be not greater than 0, in other words, when the luminance of light emitting region An that is a calculation target in step S36 (for example, light emitting region A1) is not greater than the threshold calculated in in step S34 (NO in step S37), controller 16 does not reduce the luminance of light emitting region An (for example, light emitting region A1), and maintains the luminance (step S39).

For example, in a case where the luminance of light emitting region A1 is 60%, and the threshold calculated in step S34 is 80%, controller 16 calculates difference OVR as −20% (=60%−80%) in step S36. Since difference OVR (−20%) is not greater than 0, controller 16 maintains the luminance of light emitting region A1 to be 60% in step S39.

Note that, in a case where the luminance of light emitting region An that is a calculation target in step S36 (for example, light emitting region A1) is not greater than the threshold calculated in step S34, luminance of image region Bn in image 26 (for example, image region B1 (see FIG. 7 described later)) corresponding to light emitting region An (for example, light emitting region A1) is luminance of intermediate or low gradation.

When processing in steps S36 to S39 described above for light emitting region A1 is finished, processing similar to the processing performed for light emitting region A1 is repeatedly performed for remaining light emitting regions A2 to A40 in order from light emitting region A2 to light emitting region A40 (steps S35 to S40).

The power saving control described above is performed for all light emitting regions A1 to A40 every time when image 26 of one frame is displayed on display panel 4.

For example, in the example illustrated in FIG. 6, through the power saving control described above, light emitting regions A11 to A14 each having luminance greater than 80% that is an example of the threshold are decreased to 80% in luminance. On the other hand, light emitting regions A9, A10, A15, and A16 each having luminance not greater than 80% that is the example of the threshold are maintained in luminance. In this manner, in display device 2 according to the present exemplary embodiment, power consumption of backlight 6 can be reduced by reducing each luminance of corresponding light emitting regions A1 to A40 in backlight 6 based on the comparison with the threshold.

Subsequently, an example of a change in luminance of an image before and after the power saving control is performed will be illustrated. Each of image regions B1 to B40 in image 26 illustrated in FIG. 7 is a region corresponding to each of light emitting regions A1 to A40 in backlight 6. Note that, in the example illustrated in FIG. 7, it is assumed that each luminance of light emitting regions A11 to A14, A19 to A22, and A27 to A30 corresponding to image regions B11 to B14, B19 to B22, and B27 to B30 is greater than the threshold, and each luminance of other light emitting regions is not greater than the threshold. When the above-described power saving control is performed, in the example illustrated in FIG. 7 for example, each luminance of light emitting regions A11 to A14, A19 to A22, and A27 to A30, which is greater than the threshold, decreases to the threshold. On the other hand, each luminance of light emitting regions A1 to A10, A15 to A18, A23 to A26, and A31 to A40, which is not greater than the threshold, is maintained as it is.

With this configuration, in image 26 displayed on display panel 4, each luminance of image regions B11 to B14, B19 to B22, and B27 to B30 (luminance of high gradation) decreases, and each luminance of image regions B1 to B10, B15 to B18, B23 to B26, and B31 to B40 (luminance of intermediate or low gradation) is maintained as it is. This can suppress such an event that each luminance of image regions B1 to B10, B15 to B18, B23 to B26, and B31 to B40 that are relatively dark regions (dark portions) in image 26 decreases and becomes dark. Therefore, gradation expression in the dark portions in image 26 can be improved in comparison with a conventional technique. Note that, in FIG. 7, lighter-colored density of shaded pattern indicates higher luminance in image 26.

Here, with reference to FIG. 8, a change in luminance of image 32 displayed on display panel 30 in display device 28 in a comparative example will be described.

Figure 8:
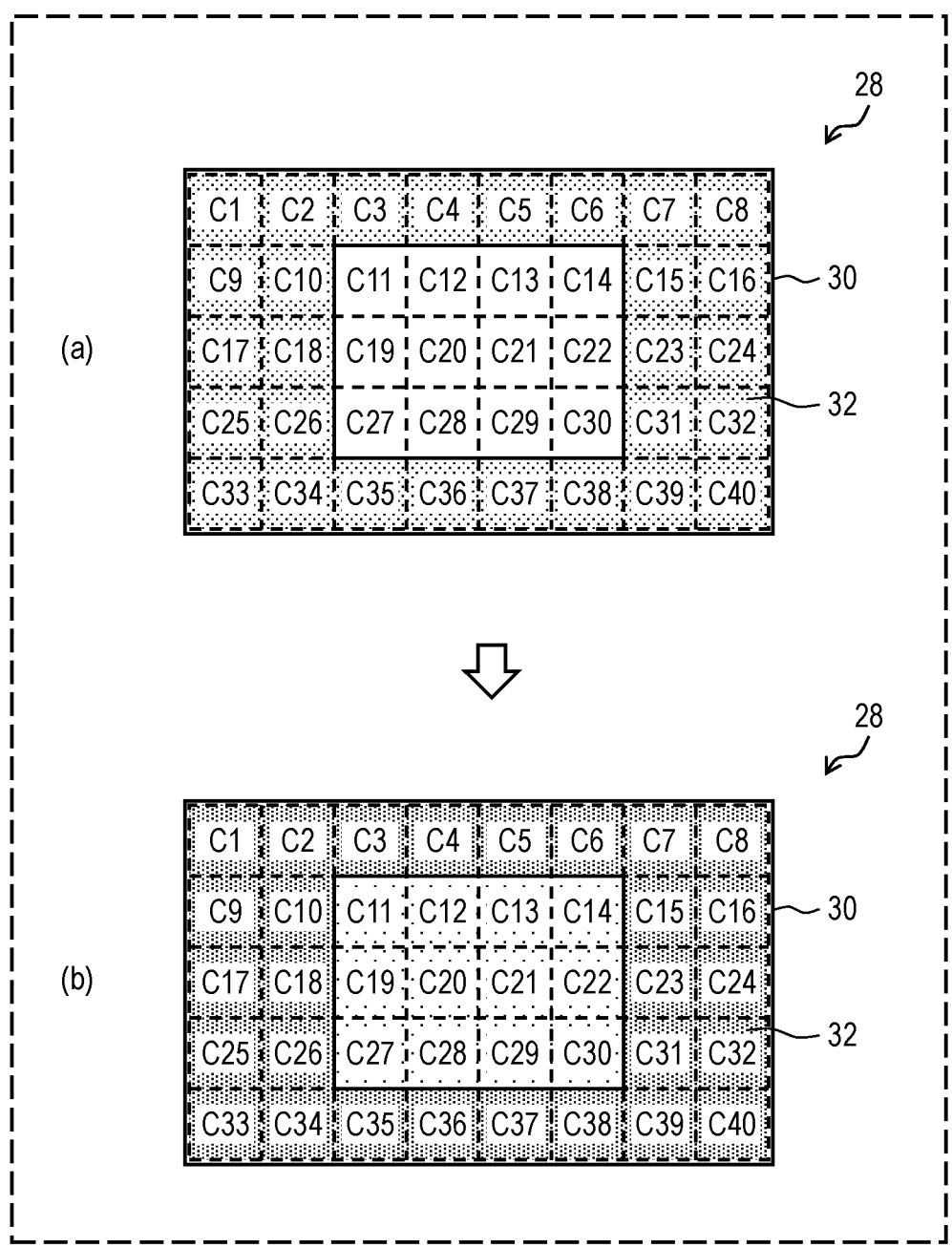
FIG. 8 is a view schematically illustrating an example of a change in luminance before and after the power saving control is performed in an image displayed on a display panel in a display device in a comparative example.

FIG. 8 is a view schematically illustrating an example of a change in luminance before and after the power saving control is performed in image 32 displayed on display panel 30 in display device 28 in the comparative example. Part (a) of FIG. 8 is a view schematically illustrating an example of luminance before the power saving control is performed in image 32 displayed on display panel 30 in the comparative example, and part (b) of FIG. 8 is a view schematically illustrating an example of luminance after the power saving control is performed in image 32 displayed on display panel 30 in the comparative example. Note that, broken lines, signs C1 to C40, and the like illustrated in FIG. 8 are illustrated for convenience in order to allow the plurality of light emitting regions to be grasped visually.

Note that, in the examples illustrated in FIG. 8, it is assumed that each luminance of light emitting regions (not illustrated) corresponding to image regions C11 to C14, C19 to C22, and C27 to C30 is greater than the threshold, and each luminance of other light emitting regions is not greater than the threshold.

In the power saving control of display device 28 in the comparative example, as described in BACKGROUND ART, when an average value of luminance of an entire backlight (not illustrated) is greater than a constant value, luminance of all light emitting regions in the backlight is simultaneously decreased. Therefore, in the examples illustrated in FIG. 8, each luminance of image regions C1 to C10, C15 to C18, C23 to C26, and C31 to C40 (luminance of intermediate or low gradation) decreases, as well as each luminance of image regions C11 to C14, C19 to C22, and C27 to C30 (luminance of high gradation), in image 32 displayed in display panel 30. As a result, each luminance of image regions C1 to C10, C15 to C18, C23 to C26, and C31 to C40 that are relatively dark regions (dark portions) in image 32 decreases and becomes dark, thereby lowering gradation expression in the dark portions in image 32.

Note that, in display device 2 according to the first exemplary embodiment, when the luminance of backlight 6 is decreased by the power saving control, controller 16 corrects gradation values of the luminance of image 26 displayed on display panel 4 for each image region Bn (n=1 to 40), by multiplying a gradation value of luminance for each pixel by a correction ratio. Controller 16 calculates the correction ratio by dividing luminance of light emitting region An corresponding to image region Bn before the power saving control is performed by luminance thereof after the power saving control is performed. For example, when luminance of light emitting region A1 is decreased from 90% to 80% by the power saving control, the correction ratio is calculated as 90/80. Then controller 16 corrects the gradation value by multiplying a gradation value of luminance for each pixel contained in image region B1 in image 26 corresponding to light emitting region A1 by the correction ratio (=90/80). This configuration can maintain contrast of image 26 at a high level, in display device 2.

[1-3. Effects and Others]

As described above, in the present exemplary embodiment, a display device includes a display panel that displays an image, a backlight that includes a light emitting surface that emits light toward a rear surface of the display panel, the light emitting surface being divided into a plurality of light emitting regions, and a controller that independently determines luminance of the backlight for each of the plurality of light emitting regions according to each luminance of a plurality of image regions in the image respectively corresponding to the plurality of light emitting regions. When the backlight satisfies a predetermined condition, while comparing each determined luminance of the plurality of light emitting regions with a threshold, the controller decreases luminance of a light emitting region having luminance greater than the threshold, and maintains luminance of a light emitting region having luminance not greater than the threshold.

Note that display device 2 is an example of the display device. Display panel 4 is an example of the display panel. Light emitting surface 8a is an example of the light emitting surface. Light emitting regions A1 to A40 are examples of the plurality of light emitting regions. Backlight 6 is an example of the backlight. Image regions B1 to B40 are examples of the plurality of image regions. Controller 16 is an example of the controller.

For example, in the example illustrated in the first exemplary embodiment, display device 2 includes display panel 4 that displays image 26, backlight 6 that includes light emitting surface 8a that emits light toward the rear surface of display panel 4, light emitting surface 8a being divided into light emitting regions A1 to A40, and controller 16 that independently determines the luminance of backlight 6 for each of light emitting regions A1 to A40 according to each luminance of image regions B1 to B40 in image 26 respectively corresponding to light emitting regions A1 to A40. When backlight 6 satisfies the predetermined condition, while comparing each determined luminance of light emitting regions A1 to A40 with the threshold, controller 16 decreases luminance of light emitting region An (n=1 to 40) having luminance greater than the threshold, and maintains luminance of light emitting region An having luminance not greater than the threshold.

In display device 2 configured as described above, the power saving control that decreases the luminance of light emitting region An having luminance greater than the threshold is performed, thereby suppressing power consumption of backlight 6. Furthermore, in the power saving control, the luminance of light emitting region An having luminance not greater than the threshold is maintained. This can suppress such an event that the luminance of image region Bn (n=1 to 40) corresponding to light emitting region An having luminance not greater than the threshold (that is, image region having the luminance of intermediate or low gradation, which is relatively dark region (dark portion)) decreases and becomes dark. Therefore, the gradation expression in the dark portions in image 26 can be improved in comparison with the conventional technique.

In the display device, the predetermined condition may be that an average value of each determined luminance of the plurality of light emitting regions is greater than a constant value.

Note that average value Av is an example of an average value of luminance. Constant value α is an example of the constant value.

For example, in the example illustrated in the first exemplary embodiment, the predetermined condition is that average value Av of each determined luminance of light emitting regions A1 to A40 is greater than constant value α.

In display device 2 configured in this manner, when power consumption of backlight 6 is relatively large (that is, when average value Av is relatively large), the power saving control can be performed.

In the display device, when the average value is greater than the constant value, the controller may compare each determined luminance of the plurality of light emitting regions with the threshold that decreases as the average value increases.

Note that the threshold illustrated in FIG. 5 is an example of the threshold.

For example, in the example illustrated in the first exemplary embodiment, when average value Av is greater than constant value α, controller 16 compares each determined luminance of light emitting regions A1 to A40 with the threshold that decreases as average value Av increases, which is illustrated in FIG. 5.

In display device 2 configured in this manner, the threshold decreases as the power consumption of backlight 6 increases. Therefore, the power saving control can be effectively performed.

In the display device, when the backlight satisfies the predetermined condition, the controller may decrease the luminance of the light emitting region having luminance greater than the threshold to the threshold and may maintain the luminance of the light emitting region having luminance not greater than the threshold.

Note that, it is an example of the predetermined condition that average value Av is greater than constant value α.

For example, in the example illustrated in the first exemplary embodiment, when backlight 6 satisfies the predetermined condition (when average value Av is greater than constant value α), controller 16 lowers the luminance of light emitting region An having luminance greater than the threshold and maintains the luminance of light emitting region An having luminance not greater than the threshold.

In display device 2 configured as described above, the power saving control that decreases the luminance of light emitting region An having luminance greater than the threshold to the threshold can be performed, when average luminance of backlight 6 is high and therefore the power consumption is large.

In the present exemplary embodiment, a method for controlling a backlight is for controlling the backlight that includes a light emitting surface that emits light toward a rear surface of a display panel for displaying an image, the light emitting surface being divided into a plurality of light emitting regions. The method for controlling the backlight includes: independently determining luminance of the backlight for each light emitting region according to each luminance of the plurality of image regions respectively corresponding to the plurality of light emitting regions; and, when the backlight satisfies the predetermined condition, while comparing each determined luminance of the plurality of light emitting regions with the threshold, decreasing luminance of a light emitting region having luminance greater than the threshold, and maintaining luminance of a light emitting region having luminance not greater than the threshold.

For example, in the example illustrated in the first exemplary embodiment, the method for controlling backlight 6 is for controlling backlight 6 that includes light emitting surface 8a that emits light toward the rear surface of display panel 4 for displaying image 26, light emitting surface 8a being divided into light emitting regions A1 to A40. The method for controlling backlight 6 includes: independently determining luminance of backlight 6 for each of light emitting regions A1 to A40 according to each luminance of image regions B1 to B40 in image 26 respectively corresponding to light emitting regions A1 to A40; and, when backlight 6 satisfies the predetermined condition, while comparing each determined luminance of light emitting regions A1 to A40 with the threshold, decreasing the luminance of light emitting region An having luminance greater than the threshold, and maintaining the luminance of light emitting region An having luminance not greater than the threshold.

In backlight 6 controlled by this control method, the power saving control that decreases the luminance of light emitting region An having luminance greater than the threshold is performed, thereby suppressing power consumption of backlight 6. Furthermore, in the power saving control, the luminance of light emitting region An having luminance not greater than the threshold is maintained. This can suppress such an event that the luminance of image region Bn corresponding to light emitting region An having luminance not greater than the threshold (i.e. region that is dark portion in image 26) decreases and becomes dark. Therefore, the gradation expression in the dark portions in image 26 can be improved in comparison with the conventional technique.

Second Exemplary Embodiment

Next, a second exemplary embodiment will be described herein with reference to FIGS. 9 and 10.

Display device 2A illustrated in the second exemplary embodiment has substantially the same configuration as display device 2 described in the first exemplary embodiment, as illustrated in FIG. 1. However, a method for controlling the backlight illustrated in the second exemplary embodiment has different points from the method for controlling the backlight described in the first exemplary embodiment. Hereinafter, a description of matters described in the first exemplary embodiment will be omitted as appropriate, and the different points from the first exemplary embodiment will mainly be described.

[2-1. Method for Controlling Backlight]

A method for controlling backlight 6 (see FIG. 2) performed by display device 2A (see FIG. 1) in the second exemplary embodiment will be described with reference to FIGS. 9 to 10.

Figure 9:
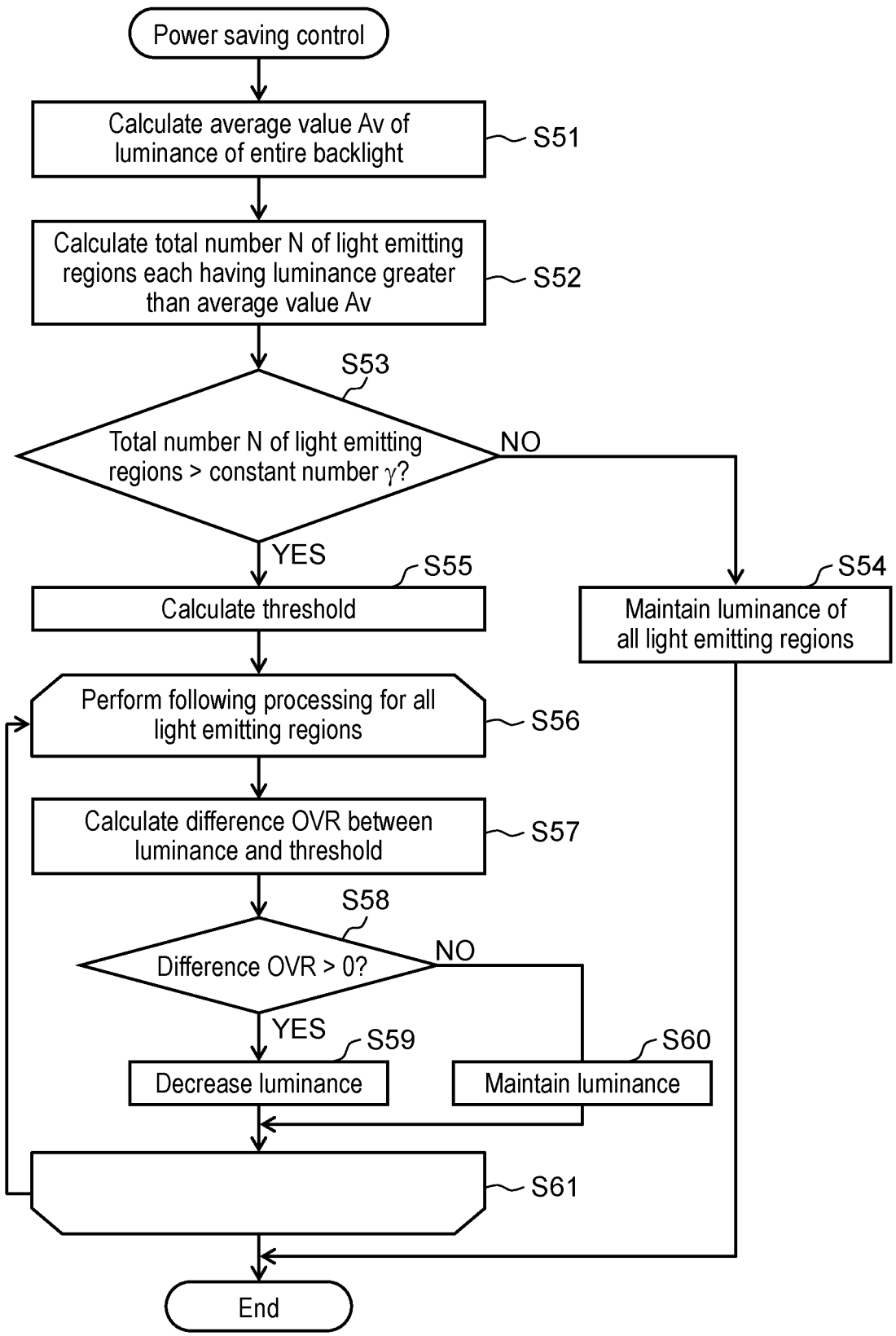
FIG. 9 is a flowchart illustrating an example of a method for controlling a backlight performed in a display device according to a second exemplary embodiment.

FIG. 9 is a flowchart illustrating an example of the method for controlling backlight 6 performed in display device 2A according to the second exemplary embodiment.

Figure 10:
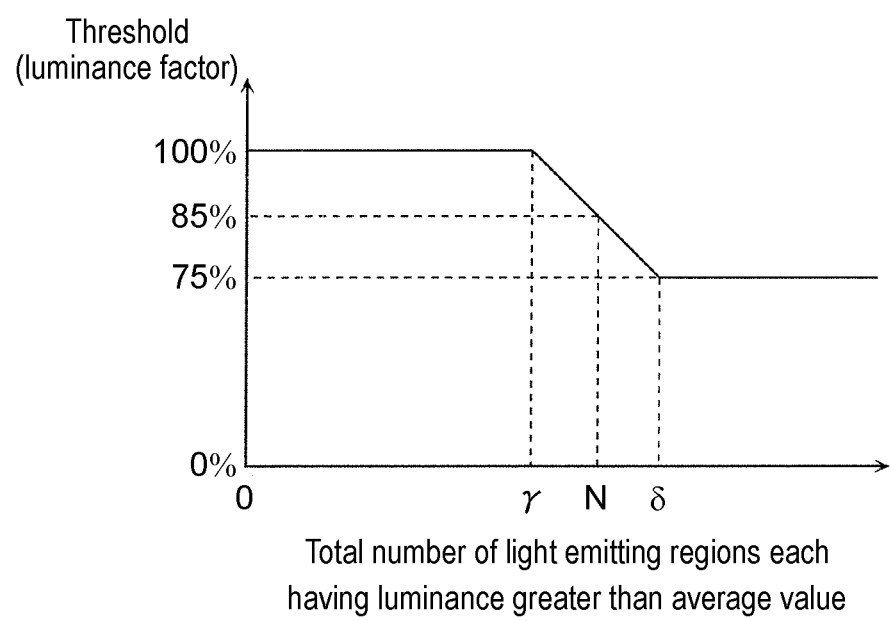
FIG. 10 is a graph illustrating an example of a relationship between a total number of light emitting regions each having luminance greater than an average value and a threshold in the display device according to the second exemplary embodiment.

FIG. 10 is a graph illustrating an example of a relationship between a total number of light emitting regions An each having luminance greater than average value Av and a threshold, in display device 2A according to the second exemplary embodiment.

In the following description of each exemplary embodiment, components substantially identical to components included in display device 2 described in the first exemplary embodiment are denoted by identical numerals or symbols, and their descriptions are omitted.

As illustrated in FIG. 9, in the method for controlling backlight 6 in the second exemplary embodiment, controller 16A (see FIG. 1) first calculates average value Av of luminance of entire backlight 6, as in step S31 described with reference to FIG. 4 in the first exemplary embodiment (step S51).

Next, controller 16A calculates total number N of light emitting regions An each having luminance greater than average value Av (step S52). Note that average value Av is an example of a predetermined value in the second exemplary embodiment.

Next, controller 16A compares total number N calculated in step S52 with constant number $\gamma$ (step S53).

In step S53, in a case where total number N is determined to be not greater than constant number $\gamma$ (NO in step S53), controller 16A does not perform the power saving control, and maintains each luminance of all light emitting regions A1 to A40 (see FIG. 2), as in step S33 described with reference to FIG. 4 in the first exemplary embodiment (step S54).

On the other hand, in step S53, in a case where total number N is determined to be greater than constant number $\gamma$ (that is, when backlight 6 satisfies a predetermined condition) (YES in step S53), controller 16A performs processing similar to each processing in steps S34 to S40 described with reference to FIG. 4 in the first exemplary embodiment to perform the power saving control (steps S55 to S61).

Note that controller 16A uses, for example, graph data illustrated in FIG. 10 to calculate a threshold in step S55.

The graph data illustrated in FIG. 10 is data indicating an example of a relationship between total number N of light emitting regions An each having luminance greater than average value Av and the threshold. This graph data is stored in advance in a storage (not illustrated) included in controller 16A, for example. In the example illustrated in FIG. 10, in a case where total number N of light emitting regions An each having luminance greater than average value Av is not greater than constant number $\gamma$, the threshold is 100% and is constant. In a case where total number N of light emitting regions An each having luminance greater than average value Av is greater than constant number $\gamma$ and is not greater than constant number $\delta$, the threshold decreases as total number N increases. In the example illustrated in FIG. 10, in a case where total number N of light emitting regions An each having luminance greater than average value Av is greater than constant number $\delta$ ($\delta > \gamma$), the threshold is 75% and is constant.

For example, in a case where total number N calculated in step S52 described above is greater than constant number $\gamma$ and is not greater than constant number $\delta$, controller 16A calculates a threshold corresponding to calculated total number N (in the example of FIG. 10, "85%") based on the graph data illustrated in FIG. 10.

[2-2. Effects and Others]

As described above, in the display device in the second exemplary embodiment, the predetermined condition may be that a total number of light emitting regions each having determined luminance greater than a predetermined value is greater than a constant number.

Note that display device 2A is an example of the display device. Controller 16A is an example of the controller. Average value Av of the luminance of entire backlight 6 is an example of the predetermined value. Constant number $\gamma$ is an example of the constant number.

For example, in the example illustrated in the second exemplary embodiment, the predetermined condition in display device 2A is that total number N of light emitting regions An each having determined luminance greater than the predetermined value (for example, average value Av of the luminance of entire backlight 6) is greater than constant number $\gamma$.

In a case where power consumption of backlight 6 is relatively large (that is, when total number N is relatively large), display device 2A configured in this manner can perform the power saving control.

Note that, in the present exemplary embodiment, an operation example in which controller 16A calculates total number N of light emitting regions An each having luminance greater than average value Av is described. However, the operation of controller 16A in the present disclosure is not limited to this operation. For example, controller 16A may calculate total number N of light emitting regions An each having luminance greater than the above-described threshold (an example of the predetermined value).

Third Exemplary Embodiment

Next, a third exemplary embodiment will be described herein with reference to FIGS. 11 and 12.

Although specific illustration is omitted, display device 2B illustrated in the third exemplary embodiment has substantially the same configuration as display device 2 described in the first exemplary embodiment or display device 2A described in the second exemplary embodiment. However, controller 16B included in display device 2B illustrated in the third exemplary embodiment has different points from controller 16 described in the first exemplary embodiment or controller 16A described in the second exemplary embodiment. Hereinafter, a description of matters described in the first or second exemplary embodiment will be omitted as appropriate, and a configuration that is not disclosed in the first or second exemplary embodiment will mainly be described.

[3-1. Controller]

First, controller 16B of display device 2B according to the third exemplary embodiment will be described herein with reference to FIGS. 11 and 12.

Figure 11:
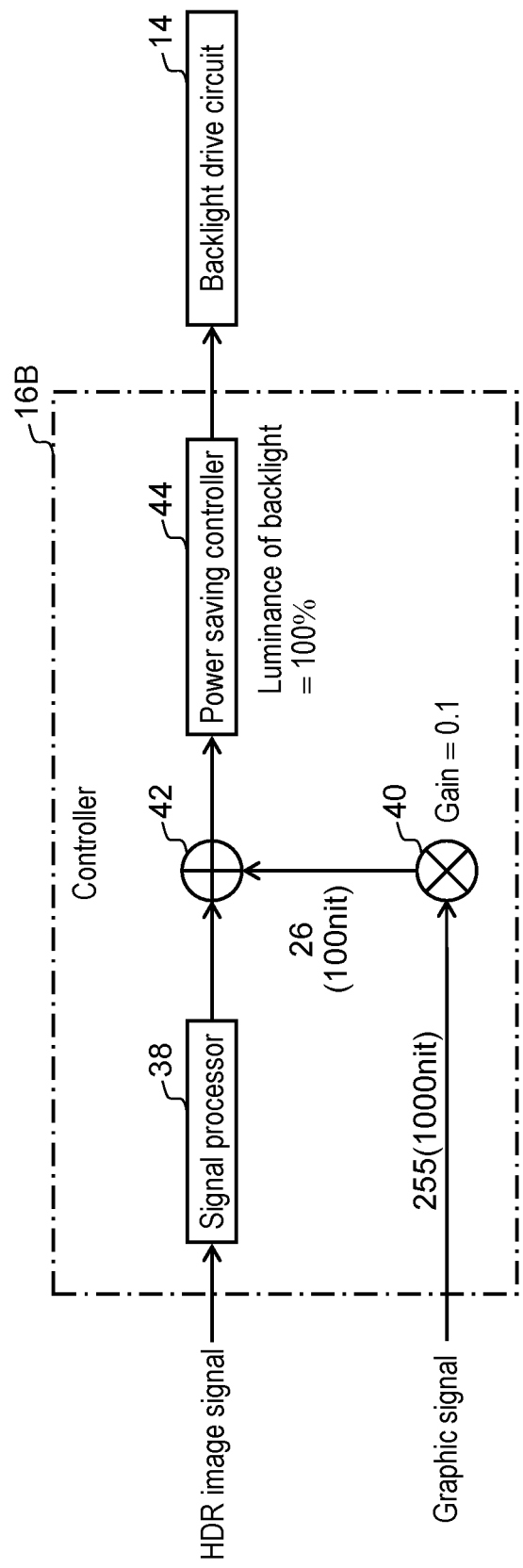
FIG. 11 is a block diagram schematically illustrating an example of a configuration of a controller of a display device according to a third exemplary embodiment.

FIG. 11 is a block diagram schematically illustrating an example of a configuration of controller 16B of display device 2B according to the third exemplary embodiment.

Figure 12:
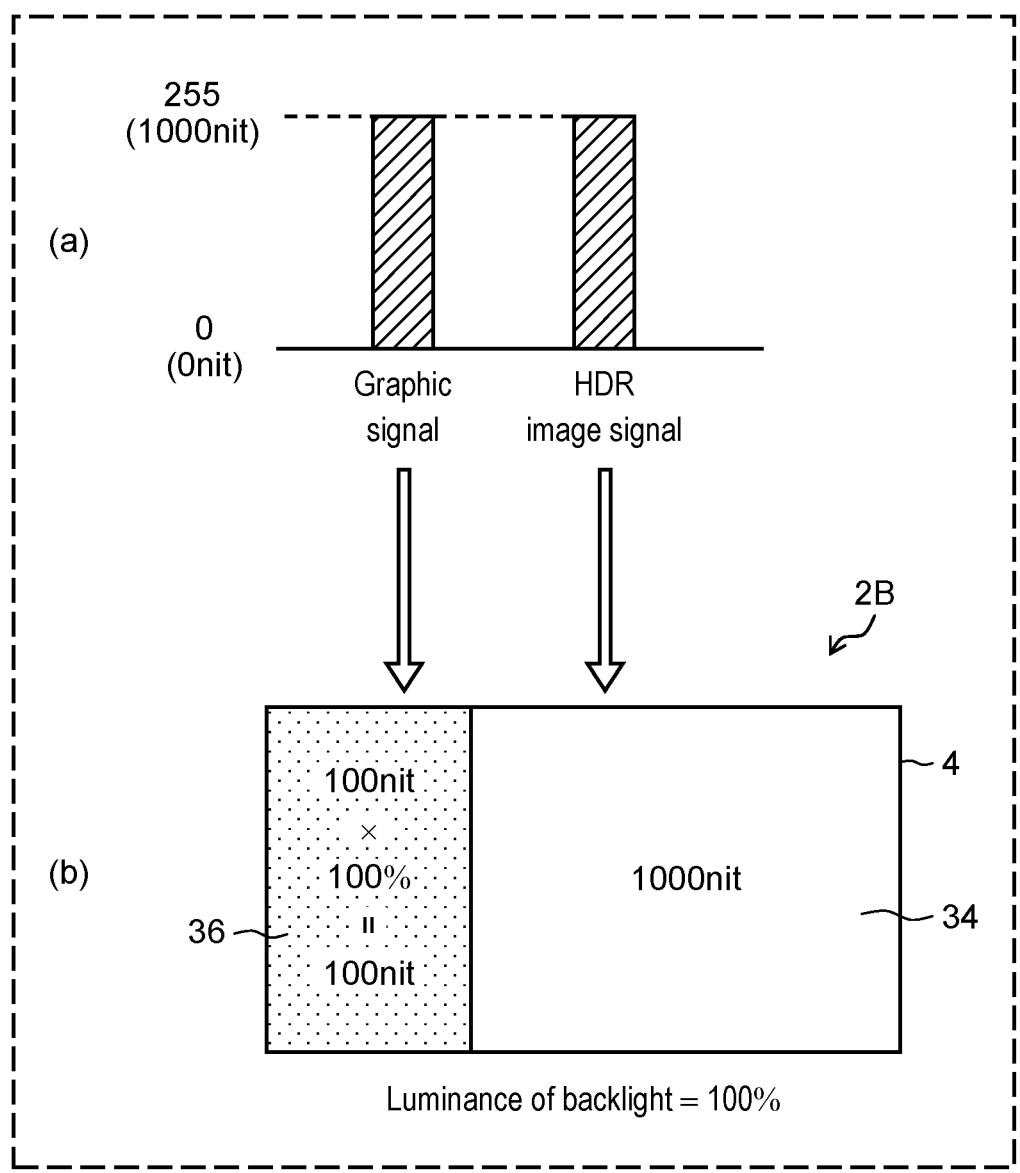
FIG. 12 is a diagram for describing luminance control of a graphic image by the controller of the display device according to the third exemplary embodiment.

FIG. 12 is a diagram for describing luminance control of graphic image 36 by controller 16B of display device 2B according to the third exemplary embodiment. Part (a) of FIG. 12 is a concept diagram illustrating an example of each display luminance data of a high dynamic range (HDR) image signal and a graphic signal, and part (b) of FIG. 12 is a diagram schematically illustrating an example of each display luminance of content image 34 and graphic image 36 that are displayed on display panel 4.

As illustrated in FIG. 11, controller 16B according to the third exemplary embodiment obtains the HDR image signal and the graphic signal.

The HDR image signal is a signal for displaying content image 34. The display luminance in the HDR image signal has a wider dynamic range than that of the display luminance in a standard dynamic range (SDR) image signal. As illustrated in part (a) of FIG. 12, the HDR image signal contains display luminance data represented by eight bits of 0 to 255 (corresponding to 0 nit to 1000 nit), for example. Note that, for example, content image 34 includes an image indicating a reproduced content, which is displayed on display panel 4 by reproducing data stored in a recording medium such as a digital versatile disc (DVD), or an image indicating a broadcast program, which is displayed on display panel 4 by receiving terrestrial digital broadcasting, satellite digital broadcasting, or the like.

The graphic signal is a signal for displaying graphic image 36 while graphic image 36 is superimposed on content image 34. As illustrated in part (a) of FIG. 12, the graphic signal contains the display luminance data represented by eight bits of 0 to 255 (corresponding to 0 nit to 1000 nit), for example. Note that graphic image 36 is, for example, an on screen display (OSD) image such as a sound volume setting menu or subtitles.

As illustrated in FIG. 11, controller 16B includes signal processor 38, multiplier 40, combiner 42, and power saving controller 44.

Signal processor 38 performs processing such as Gamma correction on the obtained HDR image signal.

Multiplier 40 multiplies the display luminance data of the obtained graphic signal by a gain for reducing the display luminance of graphic image 36 indicated by the graphic signal. Note that, in the present exemplary embodiment, the gain is a predetermined constant value (for example, 0.1).

Combiner 42 combines the HDR image signal processed by signal processor 38 with the graphic signal multiplied by the gain by multiplier 40.

Power saving controller 44 performs the power saving control by controlling the luminance of backlight 6 (see FIG. 1), as described in the first or second exemplary embodiment. Furthermore, power saving controller 44 sets the luminance of backlight 6 by using Equation 2 below. Note that, in Equation 2, the maximum luminance of display panel 4 means the maximum luminance that is capable of being represented by display panel 4.

Luminance of backlight=maximum display luminance of content image÷maximum luminance of display panel×100% (Equation 2)

Next, with reference to FIGS. 11 and 12, the luminance control of graphic image 36 by controller 16B described above will be described.

In the example illustrated in FIGS. 11 and 12, the maximum luminance of display panel 4 is 1000 nit, and the maximum display luminance of content image 34 indicated by the HDR image signal is 1000 nit. Then, in order to faithfully reproduce the display luminance of content image 34 into the HDR image signal, power saving controller 44 sets the luminance of backlight 6 to 100% (=1000 nit/1000 nit×100%) by using Equation 2 described above.

As illustrated in FIG. 11, controller 16B obtains the graphic signal including display luminance data of 255 (that is, 1000 nit), for example. Multiplier 40 multiplies the display luminance data of the obtained graphic signal by the gain (for example, 0.1). Thus, the display luminance data of the graphic signal input to combiner 42 becomes 26 (that is, 100 nit), for example. Accordingly, in a case of the example described above, since backlight 6 is lit with the luminance of 100% as illustrated in part (b) of FIG. 12, graphic image 36 is displayed on display panel 4 with the display luminance of 100 nit (=100 nit×100%). Note that content image 34 is displayed on display panel 4 with the display luminance ranging from 0 nit to 1000 nit.

[3-2. Effects and Others]

As described above, in the present exemplary embodiment, the controller included in the display device includes a combiner that combines a HDR image signal for displaying a content image with a graphic signal for displaying a graphic image while the graphic image is superimposed on the content image, and a multiplier that multiplies the graphic signal combined by the combiner by a gain for decreasing display luminance of the graphic image indicated by the graphic signal.

Note that display 2B is an example of the display device. Controller 16B is an example of the controller. Content image 34 is an example of the content image. Graphic image 36 is an example of the graphic image. Combiner 42 is an example of the combiner. Multiplier 40 is an example of the multiplier.

For example, in the example illustrated in the third exemplary embodiment, controller 16B included in display device 2B includes combiner 42 that combines the HDR image signal for displaying content image 34 with the graphic signal for displaying graphic image 36 while graphic image 36 is superimposed on content image 34, and multiplier 40 that multiplies the graphic signal combined by combiner 42 by the gain for decreasing the display luminance of graphic image 36 indicated by the graphic signal.

If controller 16B does not include multiplier 40, the display luminance data of the graphic signal input to combiner 42 becomes 255 (that is, 1000 nit). Accordingly, in a case in which backlight 6 is lit with the luminance of 100%, graphic image 36 is displayed on display panel 4 with the display luminance of 1000 nit (=1000 nit×100%). As a result, graphic image 36 becomes too bright, and there is a possibility that a user perceives glare.

However, display device 2B having the above-described configuration multiplies the graphic signal by the gain (for example, 0.1), and therefore can decrease the display luminance of graphic image 36. With this configuration, display device 2B can suppress a phenomenon that graphic image 36 becomes too bright, and can reduce the glare perceived by the user.

Fourth Exemplary Embodiment

Next, a fourth exemplary embodiment will be described herein with reference to FIGS. 13 to 15.

Although specific illustration is omitted, display device 2C illustrated in the fourth exemplary embodiment has substantially the same configuration as display device 2B described in the third exemplary embodiment. However, controller 16C included in display device 2C illustrated in the fourth exemplary embodiment has different points from controller 16B described in the third exemplary embodiment. Hereinafter, a description of matters described in the first to third exemplary embodiments will be omitted as appropriate, and a configuration that is not disclosed in the first to third exemplary embodiments will mainly be described.

[4-1. Controller]

First, controller 16C of display device 2C according to the fourth exemplary embodiment will be described herein with reference to FIGS. 13 and 14.

Figure 13:
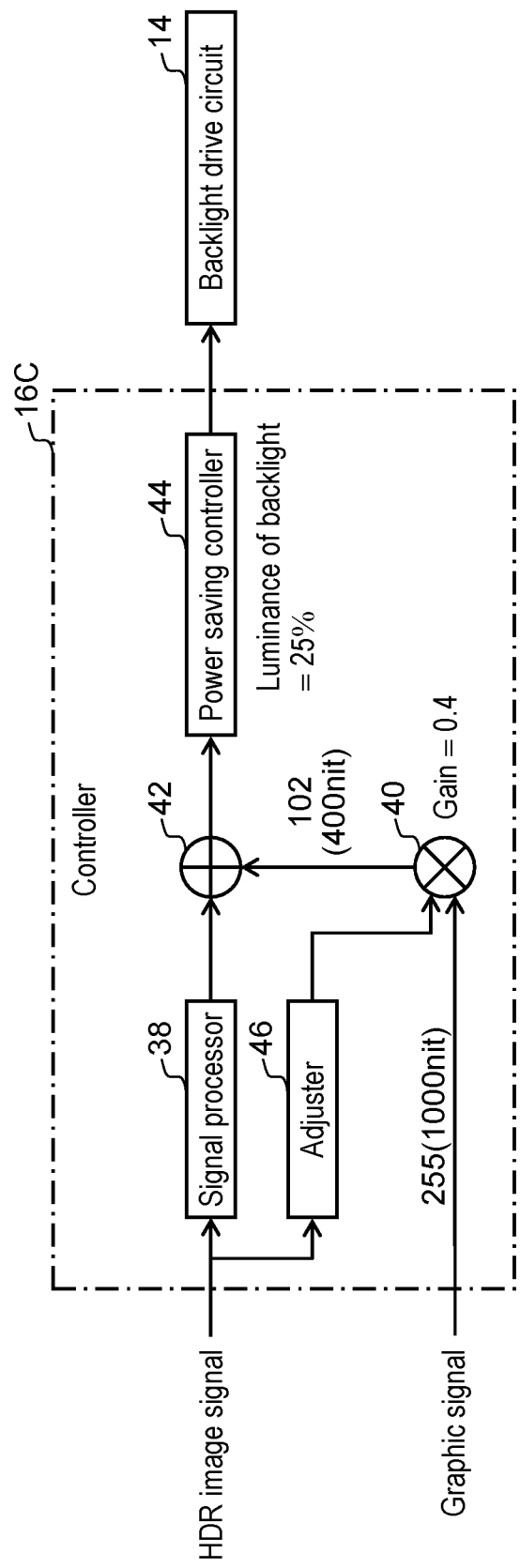
FIG. 13 is a block diagram schematically illustrating an example of a configuration of a controller of a display device according to a fourth exemplary embodiment.

FIG. 13 is a block diagram schematically illustrating an example of a configuration of controller 16C of display device 2C according to the fourth exemplary embodiment.

Figure 14:
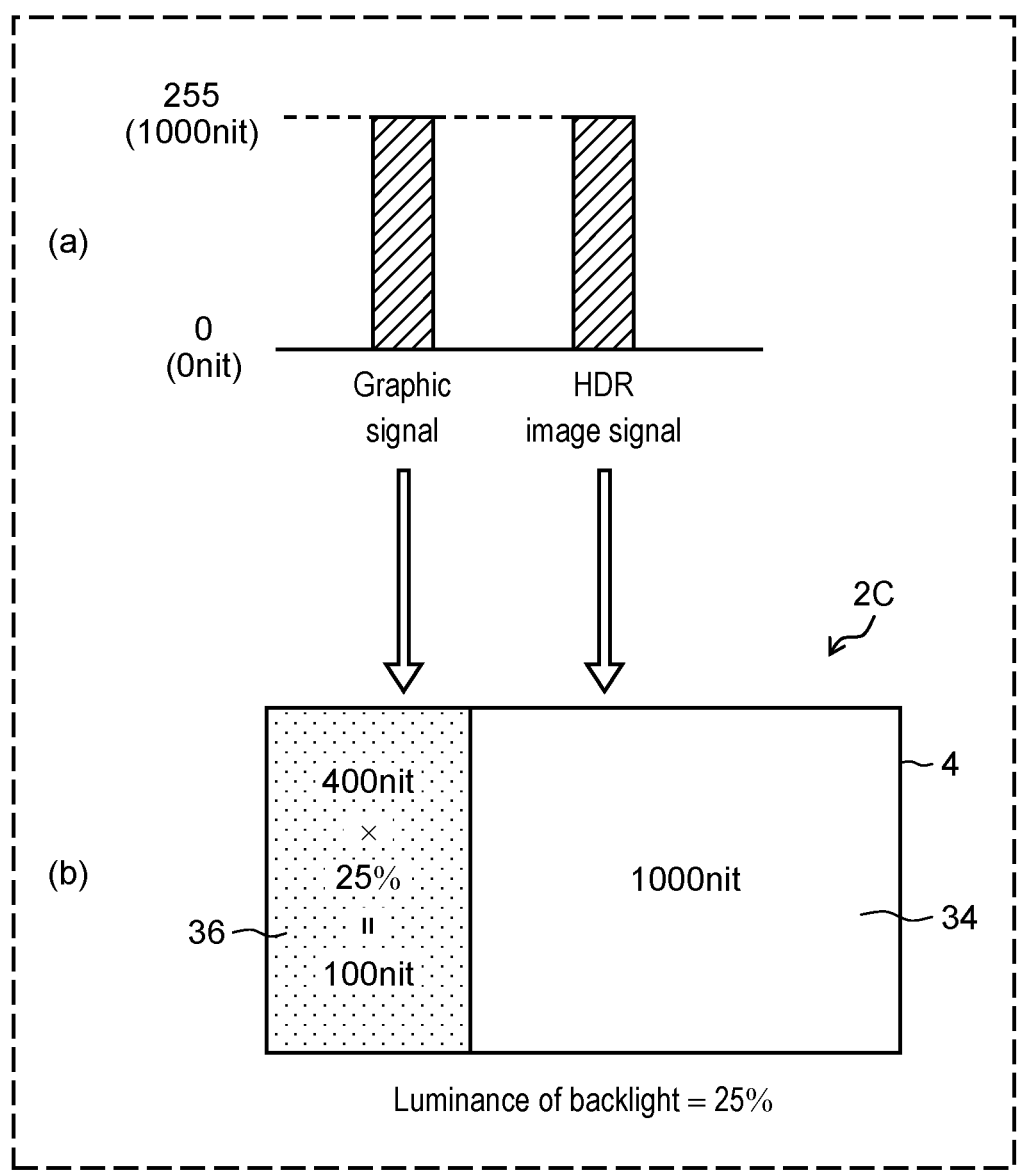
FIG. 14 is a diagram for describing luminance control of a graphic image by the controller of the display device according to the fourth exemplary embodiment.

FIG. 14 is a diagram for describing luminance control of graphic image 36 by controller 16C of display device 2C according to the fourth exemplary embodiment. Part (a) of FIG. 14 is a concept diagram illustrating an example of each display luminance data of the HDR image signal and the graphic signal, and part (b) of FIG. 14 is a diagram schematically illustrating an example of each display luminance of content image 34 and graphic image 36 that are displayed on display panel 4.

As illustrated in FIG. 13, controller 16C according to the fourth exemplary embodiment includes adjuster 46, in addition to signal processor 38, multiplier 40, combiner 42, and power saving controller 44 that are included in controller 16B described in the third exemplary embodiment.

Adjuster 46 adjusts the gain of multiplier 40 based on the maximum display luminance of content image 34 indicated by the HDR image signal and the luminance of backlight 6. More specifically, adjuster 46 adjusts the gain by using Equation 3 below. Note that "desired display luminance of graphic image" in Equation 3 is display luminance preset by the user, and is 100 nit, for example.

$$\text{Gain} = \text{desired display luminance of graphic image} \div \text{maximum display luminance of content image} \div \text{luminance of backlight} \quad \text{(Equation 3)}$$

Next, with reference to FIGS. 13 and 14, the luminance control of graphic image 36 by controller 16C described above will be described.

In the example illustrated in FIGS. 13 and 14, the maximum luminance of display panel 4 is 4000 nit, and the maximum display luminance of content image 34 indicated by the HDR image signal is 1000 nit. Then, in order to faithfully reproduce the display luminance of content image 34 into the HDR image signal, power saving controller 44 sets the luminance of backlight 6 to 25% (=1000 nit/4000 nit×100%) by using Equation 2 described above.

As illustrated in FIG. 13, controller 16C obtains the graphic signal including display luminance data of 255 (that is, 1000 nit), for example. Adjuster 46 adjusts the gain to, for example, 0.4 (=100 nit÷1000 nit÷25%) by using Equation 3. Multiplier 40 multiplies the display luminance data of the obtained graphic signal by the gain adjusted by adjuster 46. Thus, the display luminance data of the graphic signal input to combiner 42 becomes 102 (that is, 400 nit), for example.

Accordingly, in a case of the example described above, since backlight 6 is lit with the luminance of 25% as illustrated in part (b) of FIG. 14, graphic image 36 is displayed on display panel 4 with the display luminance of 100 nit (=400 nit×25%). Note that content image 34 is displayed on display panel 4 with the display luminance ranging from 0 nit to 1000 nit.

Note that adjuster 46 appropriately adjusts the gain of multiplier 40 when the maximum display luminance of content image 34 indicated by the HDR image signal and the luminance of backlight 6 are changed. For example, when the maximum luminance of display panel 4 is 2000 nit, the maximum display luminance of content image 34 is 1000 nit, and the luminance of backlight 6 is 50% (=1000 nit/2000 nit×100%), adjuster 46 adjusts the gain to 0.2 (=100 nit÷1000 nit÷50%). In this case, graphic image 36 is displayed on display panel 4 with the display luminance of 100 nit (=200 nit×50%) that is the same as the case described above.

[4-2. Effects and Others]

As described above, in the present exemplary embodiment, the controller included in the display device further includes an adjuster that adjusts the gain based on maximum display luminance of the content image indicated by the HDR image signal and the luminance of the backlight.

Note that display device 2C is an example of the display device. Controller 16C is an example of the controller. Adjuster 46 is an example of the adjuster.

For example, in the example illustrated in the fourth exemplary embodiment, controller 16C included in display device 2C further includes adjuster 46 that adjusts the gain based on the maximum display luminance of content image 34 indicated by the HDR image signal and the luminance of backlight 6, in addition to the components included in controller 16B.

Here, with reference to FIG. 15, the luminance control of graphic image 106 by display device 100 in a comparative example will be described. Note that, display device 100 has substantially the same configuration as display device 2C except that adjuster 46 is not provided.

Figure 15:
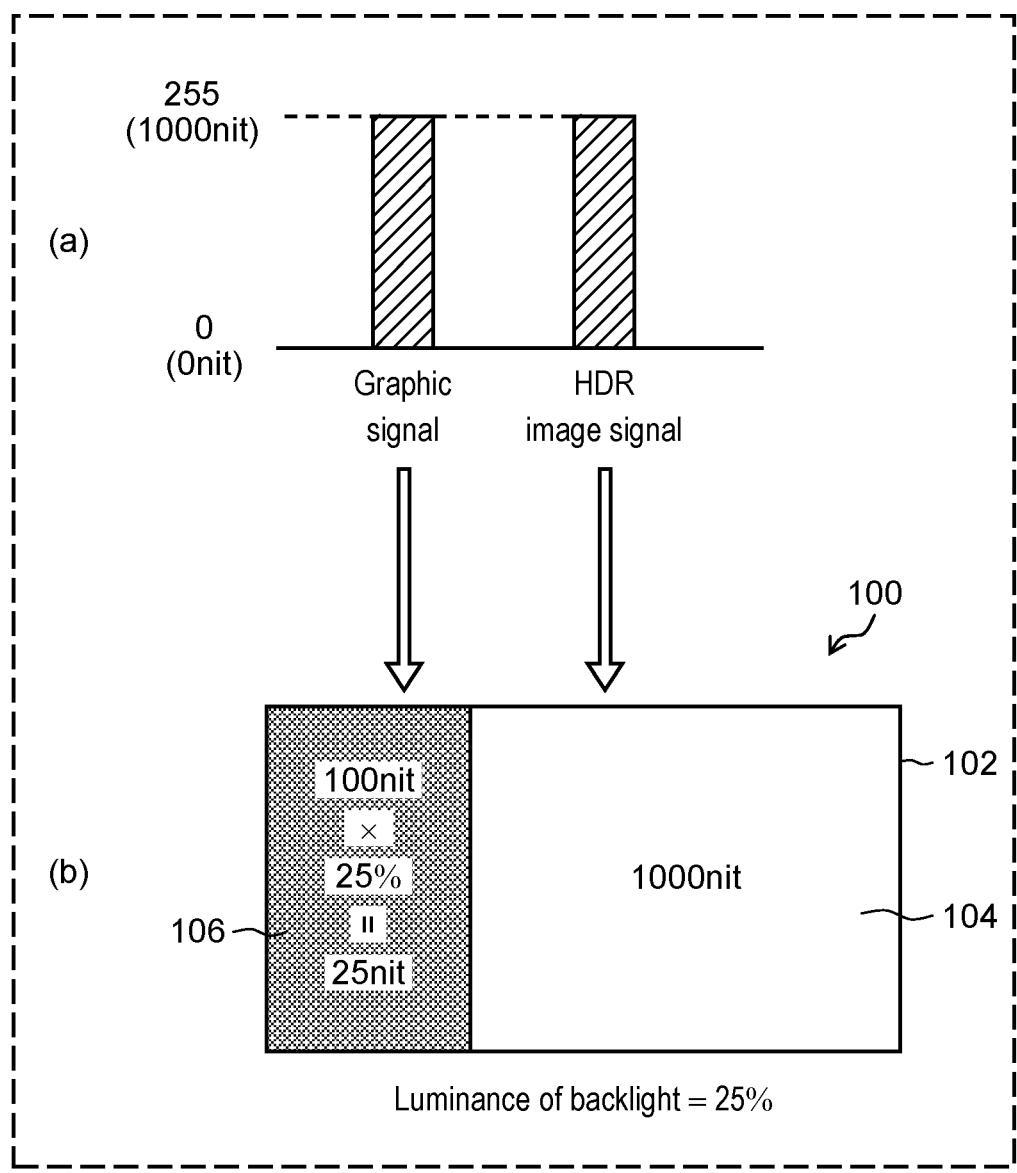
FIG. 15 is a diagram for describing luminance control of a graphic image by the display device in the comparative example.

FIG. 15 is a diagram for describing the luminance control of graphic image 106 by display device 100 in the comparative example. Part (a) of FIG. 15 is a concept diagram illustrating an example of each display luminance data of the HDR image signal and the graphic signal, and part (b) of FIG. 15 is a diagram schematically illustrating an example of each display luminance of content image 104 and graphic image 106 that are displayed on display panel 102.

As illustrated in FIG. 15, in display device 100 in the comparative example, a gain of a multiplier (not illustrated) is a constant value (for example, 0.1), as in the third exemplary embodiment.

In the example illustrated in FIG. 15, the maximum luminance of display panel 102 is 4000 nit, and the maximum display luminance of content image 104 indicated by the HDR image signal is 1000 nit. Then, in order to faithfully reproduce the display luminance of content image 104 into the HDR image signal, a power saving controller (not illustrated) sets luminance of a backlight (not illustrated) to 25%.

As illustrated in FIG. 15, a controller (not illustrated) obtains a graphic signal including display luminance data of 255 (that is, 1000 nit), for example. The multiplier multiplies the display luminance data of the obtained graphic signal by the gain. Thus, the display luminance data of the graphic signal input to a combiner (not illustrated) is 26 (that is, 100 nit), for example.

Accordingly, in a case of the example described above, since the backlight is lit with the luminance of 25% as illustrated in part (b) of FIG. 15, graphic image 106 is displayed on display panel 102 with the display luminance of 25 nit (=100 nit×25%). In this manner, in display device 100 in the comparative example, when the luminance of the backlight is lower than 100% (that is, when the maximum display luminance of content image 104 is lower than the maximum luminance of display panel 102), graphic image 106 may become too dark, and thus there is a possibility that visibility of graphic image 106 decreases.

However, display device 2C having the above-described configuration appropriately adjusts the gain by using adjuster 46, and therefore can suppress a phenomenon that the display luminance of graphic image 36 becomes too dark, even when the luminance of backlight 6 is lower than 100%. This configuration can enhance the visibility of graphic image 36 in display device 2C.

Other Exemplary Embodiments

As described above, the first to fourth exemplary embodiments have been described to exemplify a technique disclosed in the present application. However, the technique in the present disclosure is not limited to those, and can also be applied to an exemplary embodiment in which modification, replacement, addition, omission, or the like is performed. In addition, a new exemplary embodiment can be made by combining the components described in the above first to fourth exemplary embodiments.

Therefore, other exemplary embodiments will be described below.

In the first to fourth exemplary embodiments, an exemplary configuration where display device 2 (2A, 2B, 2C) is a liquid crystal television receiver have been described. However, the present disclosure is not limited to this configuration. Display device 2 (2A, 2B, 2C) may be a liquid crystal display for a personal computer, for example.

In the first and second exemplary embodiments, in the power saving control, an exemplary operation where controller 16 (16A) decreases the luminance of light emitting region An having luminance greater than the threshold to the threshold have been described. However, the present disclosure is not limited to this operation example. For example, in the power saving control, controller 16 (16A) may decrease the luminance of light emitting region An having luminance greater than the threshold by a fixed value. In this case, for example, when the fixed value is 10% and the luminance of light emitting region A1 is 90%, controller 16 (16A) decreases the luminance of light emitting region A1 to 80% (=90%−10%).

In the first to fourth exemplary embodiments, an exemplary configuration where one LED 10 is disposed in each of light emitting regions A1 to A40 have been described. However, the present disclosure is not limited to this configuration. A plurality of LEDs 10 (for example, two LEDs) may be disposed in each of light emitting regions A1 to A40.

In the first to fourth exemplary embodiments, each component may be configured with dedicated hardware, or may be implemented by executing a software program configured so as to correspond to each component. More specifically, each component may be implemented by reading and executing a software program stored in a recording medium such as an optical disk, a magnetic disk, or a semiconductor memory, by a program execution unit such as a central processing unit (CPU) or a processor.

Furthermore, the present disclosure may be implemented by a module in which a computer program or a digital signal is stored in a computer-readable storage medium (for example, an optical disk, a magnetic disk, or a semiconductor memory).

As described above, the exemplary embodiments have been described to exemplify the technique disclosed in the present disclosure. For the description, the accompanying drawings and detailed description are provided.

Therefore, the components described in the accompanying drawings and the detailed description may include not only the components essential for solving the problem but also components that are not essential for solving the problem in order to illustrate the techniques. For this reason, even if these unessential components are described in the accompanying drawings and the detailed description, these unessential components should not be immediately approved as being essential.

Further, since the above exemplary embodiments are for illustrating the technique in the present disclosure, various modifications, substitutions, additions, omissions or the like can be performed within the scope of claims and equivalent scope of claims.

INDUSTRIAL APPLICABILITY

The present disclosure is applicable to a display device provided with a backlight. More specifically, the present disclosure is applicable to a display device that performs power saving control of a backlight with local dimming, for example.

REFERENCE MARKS IN THE DRAWINGS 2, 2A, 2B, 2C, 28, 100: display device
4, 30, 102: display panel
4a: display screen
6: backlight
8: substrate 8a: light emitting surface
10: LED
12: display panel drive circuit
14: backlight drive circuit
16, 16A, 16B, 16C: controller
18: scanning line drive circuit
20: signal line drive circuit
22: control line
24: data line
26, 32: image
34, 104: content image
36, 106: graphic image
38: signal processor
40: multiplier
42: combiner
44: power saving controller
46: adjuster
A1 to A40, An: light emitting region
B1 to B40, Bn, C1 to C40: image region

The invention claimed is:

1. A display device comprising:
a display panel that displays an image;
a backlight having a light emitting surface for emitting light toward a rear surface of the display panel, the light emitting surface being divided into light emitting regions; and
a controller that determines luminance of each light emitting region of the backlight, according to luminance of image regions in the image respectively corresponding to the light emitting regions, wherein
when an average value of the determined luminance of the light emitting regions is greater than a constant value, the controller (1) sets a threshold based on the average value used to be compared with the constant value, (2) compares the determined luminance of each light emitting region with the threshold, (3) decreases luminance of a first light emitting region, having the determined luminance greater than the threshold, in the light emitting regions, and (4) maintains luminance of a second light emitting region, having the determined luminance not greater than the threshold, in the light emitting regions, and
the controller sets the threshold so that the threshold decreases as the average value increases based on information indicating a correlation between the average value and the threshold.

2. The display device according to claim 1, wherein, when the average value of the determined luminance of the light emitting regions is greater than the constant value, the controller decreases the luminance of the first light emitting region having the determined luminance greater than the threshold to the threshold, and maintains the luminance of the second light emitting region having the determined luminance not greater than the threshold.

3. The display device according to claim 1, wherein the controller includes:
a combiner that combines a high dynamic range (HDR) image signal for displaying a content image with a graphic signal for displaying a graphic image while the graphic image is being superimposed on the content image; and
a multiplier that multiplies the graphic signal combined by the combiner by a gain that decreases display luminance of the graphic image indicated by the graphic signal.

4. The display device according to claim 3, wherein the controller further includes an adjuster that adjusts the gain based on maximum display luminance of the content image indicated by the HDR image signal and the luminance of the backlight.

5. A method for controlling a backlight having a light emitting surface for emitting light toward a rear surface of a display panel for displaying an image, the light emitting surface being divided into light emitting regions, the method comprising:
determining luminance of each light emitting region of the backlight, according to luminance of image regions in the image respectively corresponding to the light emitting regions; and
when an average value of the determined luminance of the light emitting regions is greater than a constant value, (1) setting a threshold based on the average value used to be compared with the constant value, (2) comparing the determined luminance of each light emitting region with the threshold, (3) decreasing luminance of a first light emitting region, having the determined luminance greater than the threshold, in the light emitting regions, and maintaining luminance of a second light emitting region, having the determined luminance not greater than the threshold, in the light emitting region, wherein
the threshold is set so that the threshold decreases as the average value increases based on information indicating a correlation between the average value and the threshold.

* * * * *